United States Patent Office 3,751,403
Patented Aug. 7, 1973

3,751,403
RAPID ANIONIC POLYMERIZATION OF VINYL AROMATIC MONOMERS
Junji Hara, Kamakura, Yoshiharu Nakazima, Yokohama, and Yoshitoshi Honjo, Kamakura, Japan, assignors to Mitsui Toatsu Chemicals, Incorporated, Tokyo, Japan
No Drawing. Filed Sept. 14, 1971, Ser. No. 180,511
Claims priority, application Japan, Sept. 22, 1970, 45/83,204
Int. Cl. C08f 19/02
U.S. Cl. 260—88.2 C
16 Claims

ABSTRACT OF THE DISCLOSURE

An aromatic vinyl monomer containing an organo alkali metal anionic catalyst can be rapidly polymerized without the debilitating effects of heat of polymerization if anionic polymerization is initiated by heating at least one small local area to a temperature over 40° C. and sequentially continuing polymerization through surrounding areas progressively using heat of polymerization generated in each preceding area to initiate anionic polymerization in the surrounding monomer area.

---

This invention relates to a process of polymerizing vinyl aromatic monomers. More particularly, this invention relates to utilizing a portion of the heat of polymerization; controlling the rate of polymerization and providing substantially even dissipation of excess heat of polymerization.

In prior art processes for the manufacture of vinyl aromatic polymers, industrially employed hitherto the entire monomer mixture is heated to a sufficient temperature that polymerization starts in the presence of a polymerization catalyst. As the monomer begins to polymerize, efforts to control the polymerization temperature are attempted by removing large amounts of heat of polymerization from the polymerization system.

However, the removal of large amounts of heat of polymerization from the polymerization system to adjust the polymerization temperature is extremely difficult and inefficient because of the increased viscosity which occurs during polymerization and the very large amounts of heat encountered. The disadvantages of these processes are, for example, a complicated polymerization reactor necessary to remove large amounts of heat or a substantial reduction of production efficiency to avoid production of large amounts of excess heat.

In order to overcome the above mentioned disadvantages in the prior art polymerization processes, we have discovered a very effective method of controlling, utilizing and dissipating the heat in the polymerization system while maintaining good efficiency and rapid polymerization.

This invention involves a process for the manufacture of vinyl aromatic polymers characterized by heating any small part (local area) of a mixture of a vinyl aromatic monomer and an anionic polymerization catalyst to a temperature of at least 40° C. The anionic polymerization is started in the local area, heated and the polymerization of the remaining vinyl aromatic monomer present in said mixture progresses uniformly as it is heated by the heat of polymerization generated from the polymerization of adjacent monomer.

Organo alkali metal compounds which may be used as the anionic polymerization catalystst in this invention include alkyl-, aryl-, alkaryl-, and arylalkyl- alkali metal compounds such as n-butyl lithium, sec-butyl lithium, n-amyl lithium, phenyl lithium, benzyl lithium, hexylene dilithium, ethyl sodium, n-amyl sodium, sodium naphthalene, benzyl sodium, tetra alphamethylstyrene disodium, n-hexyl potassium, benzyl potassium, phenyl potassium, n-hexyl rubidium, n-amyl cesium and the like. Mixtures of two or more of the organo alkali metal compounds may be used and the alkyl groups can have 1 to 20 carbon atoms, preferably 2 to 8 carbon atoms while the aryl groups may have up to 20 carbons and preferably 6 to 12 carbon atoms.

Among anionic polymerization catalyst which may be used in this invention, organo lithium compounds are especially preferred.

The amount of anionic polymerization catalysts used in this invention is in general about 0.02–3.5 mols per 1,000 mols of monomer and preferably about 0.5 to 1.0 mol yer 1,000 mols of monomer.

The monomers which may be used in this invention are compounds having a vinyl radical attached directly to the benzene ring. Suitable monomers include, for example, styrene, ortho-methyl styrene, para-methyl styrene, 2,5-dimethyl styrene, divinyl benzene and the like. Mixtures of two or more of them may be used also.

Styrene is the preferred monomer because it is available at a low cost.

In the process according to this invention, a small local area of the mixture of the aromatic vinyl monomer and the anionic polymerization catalyst is heated to a temperature above 40° C., which has an important significance that will be understood from the following description.

If vinyl compounds other than aromatic monomers are used in the polymerization, instead of the monomers of this invention, the non-aromatic monomers are not substantially polymerized to polymers even though the procedure of this invention is followed.

Efforts to polymerize aromatic vinyl monomers of this invention using polymerization catalysts other than the anionic catalysts used in this invention are not successful in obtaining substantial polymerization of monomers.

According to the present invention, when any part of the monomer mixture and at least one organo alkali metal compound is heated to a temperature above 40° C., the monomer in said part is anionically polymerized to a polymer at a much greater rate than the polymerization of the monomer in other parts of said mixture. Thus, when any part of said mixture is heated to a temperature above 40° C., the monomer of said part forms a base point, from which the anionic polymerization progressively spreads throughout the entire system. When said anionic polymerization spreads progressively throughout the reaction system, the generation of polymerization heat with the rapid anionic polymerization does not all occur at once and moves with the progress of the rapid polymerization, while portions thereof are absorbed to initiate polymerization the adjacent monomer mixture. Since the polymerization is not spontaneous throughout the mixture, the radiation of excess heat is possible and the anionically polymerized portions may cool naturally.

Therefore, the heat of polymerization generated is not accumulated in large amounts because of natural dissipation and utilization to initiate succeeding polymerizations. As is obvious from the above description, the mixture around the portions anionically polymerizing receives the heat of polymerization, thereby the monomer in the mixture around said portions is initiated to anionically polymerize at a high rate and generates polymerization heat, which is further dissipated to the circumferentially surrounding monomer in the mixture which in turn begins rapid polymerization.

Thus, the rapid anionic polymerization of monomer in said mixture moves substantially radially until the monomer is entirely polymerized. The movement of the anionic polymerization occurs at a high rate of transmission, so that the polymerization time required for all of the monomer present in the mixture can be very short. From the viewpoint of industrial practice, this invention is very valuable and can produce a polymer with excellent efficiency without heat debilitation.

The polymer obtained by the process of the present invention is of an excellent quality because there is no large accumulation of polymerization heat in the course of the anionic polymerization and disadvantages such as discoloration and deterioration of mechanical properties are eliminated.

It is important to maintain the temperature of the entire monomer mixture, prior to polymerization, below 40° C. and preferably cooler than room temperature. The most advantageous temperature depends on the amount of monomer mixture to be polymerized and the shape of the polymerization product as well as the heat of polymerization of the specific aromatic vinyl monomer mixture. The heat of polymerization of the various aromatic vinyl monomers is known and those skilled in the art can easily determine the most advantageous prepolymerization temperature for the monomer mixture. In selecting a prepolymerization temperature, consideration must also be given to the development of sufficient heat of polymerization to assure initiation of anionic polymerization in the surrounding monomer. While 40° C. is the temperature at which anionic polymerization will begin, initiating anionic polymerization is generally accomplished by raising the temperature of the local area to be polymerized over 60° C. and preferably from about 80 to 110° C. Since anionic polymerization proceeds more rapidly at the higher temperatures, more heat is developed in a given time and the progressive polymerization of the entire monomer mixture is completed quicker. When using higher temperatures (80–110° C.) to initiate polymerization, the prepolymerization temperature should be lowered to about 0° C. or less to assure dissipation of excess heat of polymerization. Overcooling the monomer mixture before polymerization should be avoided, since the heat of polymerization generated in any local area will not be sufficient to raise the temperature of the surrounding local area over 40° C. and the progressive anionic polymerization of the present invention will not be accomplished.

When the anionic polymerization is begun by raising the temperature of the whole mixture above 40° C., the rate of anionic polymerization of whole mixture is accelerated simultaneously resulting in the accumulation of polymerization heat in a large amount throughout the whole mixture. The polymerization heat cannot be removed effectively and the advantages of the present invention are lost.

Heating only a portion of the monomer mixture to a temperature over 40° C. may be accomplished by any one of several methods. For example, an electric heater or hot piece of metal may be partially inserted into the mixture until anionic polymerization has begun. After polymerization starts, the heater or heating element is removed and polymerization of the remaining mixture is progressively initiated by the heat of polymerization of adjacent monomer. Another method of initiating the polymerization reaction is through the addition of a small amount of a chemical initiator such as Lewis base materials to one portion of the mixture. The chemical initiator will start the anionic polymerization and the heat generated therefrom will initiate the remaining monomer mixture causing the anionic polymerization to proceed circumferentially. Examples of chemical initiators which may be used in practicing the present invention include ethers, such as, tetrahydrofuran and dioxane and amines, such as triethylamine and N,N,N',N'-tetramethylethylenediamine. Once anionic polymerization of a portion of an aromatic vinyl monomer mixture containing an organo alkali metal compound begins, the entire mixture will polymerize progressively as the heat of polymerization spreads with progress of the anionic polymerization.

The particular location of the portion of the monomer mixture which is heated above 40° C. is not critical. When articles extending over a very large area are to be made by the process of the present invention, two or more locations may be heated in order that polymerization may be accomplished more rapidly. Those skilled in the art can easily determine the number of locations and where to initiate with a heat source.

The anionic polymerization catalysts are generally used as a solution of 5–30% by weight of hydrocarbon compounds such as hexane and heptane and/or other inert compounds such as liquid paraffin.

The anionic polymerization of monomer by means of anionic polymerization catalysts in the process according to this invention is carried out preferably in an inert atmosphere which should be one that does not inactivate the anionic polymerization catalysts. Helium, methane and nitrogen are examples of suitable inert gases.

In practicing the present invention, the monomer mixture may also contain additives such as for example, plasticizers, fillers, fibrous materials, coloring agents, antistatic agents, and reinforcing agents such as natural and synthetic rubber.

When vinyl monomers which are not aromatic such as methyl methacrylate, methacrylic acid, methyl vinyl ketone, vinyl chloride and vinyl acetate are used in the process according to this invention, the substantial anionic polymerization of the monomer does not occur and the excellent results according to the present invention are not obtained.

In the practice of this invention, the anionic polymerization of said mixture in a mold is especially advantageous.

The following examples are presented to illustrate preferred embodiments of the invention.

EXAMPLE 1

Four experiments as shown in Table 1 were carried out by placing 500 g. of styrene in a high-pressure glass vessel which had been completely purged with nitrogen gas. The temperature of styrene was maintained at 0° C. by a constant temperature water bath. Two ml. (corresponding to 0.65 mol per 1000 mols of styrene) of n-butyl lithium as the anionic polymerization catalyst as a 12% solution in liquid paraffin were added thereto with stirring and the mixture was then stirred thoroughly. The resulting mixture was placed in a polymerization vessel having a diameter of 0.8 cm., a height of 60 cm., maintained at 7° C. and sealed with nitrogen gas. The addition of gas was continued until a pressure of 10 kg./cm.$^2$ (gauge) was obtained.

Thereafter, the polymerization vessel containing the monomer mixture was immersed in a water bath at 7° C. and the anionic polymerization of styrene was conducted according to each embodiment as described in paragraph 1 of each experiment in Table 1.

The time from the start of anionic polymerization to the completed formation of polystyrene is also shown in Table 1 as well as the properties of polymer and the efficiency of polymerization heat removal.

Experiments 1, 2 and 3 are according to the present invention, while Experiment 4 is a control and does not follow the process of the present invention.

TABLE 1

Experiment No. 1

The polymerization vessel was immersed in a water bath maintained at 7° C. A part of mixture was placed in the polymerization vessel and was heated to 80° C. by a heater inserted into the monomer. Anionic polymerization of the styrene mixture began in the area adjacent to the heater and the remaining styrene was progressively initiated by the heat of polymerization from each preceding area.

The time required for the anionic polymerization was 4 minutes. The resulting polystyrene was not discolored and had a tensile strength of 450 kg./cm.$^2$ showing a high mechanical strength.

The polymerization heat was removed effectively in the anionic polymerization of styrene by dipping the polymerization vessel in a water bath at the temperature mentioned in the first paragraph. The maximum temperature in the course of anionic polymerization did not exceed 190° C.

Experiment No. 2

Five ml. of tetrahydrofuran was added to a small part of mixture in the polymerization vessel which was immersed in a water bath at 7° C. The temperature of the treated part rose to 100° C. The anionic polymerization of styrene was started and anionic polymerization progressed to the remaining styrene in the mixture sequentially.

The time required for the anionic polymerization was 3.5 minutes. The resulting polystyrene was not discolored and had a tensile strength of 450 kg./cm.$^2$ showing a high mechanical strength.

The polymerization heat was removed effectively in the anionic polymerization of styrene by dipping the polymerization vessel in a water bath at the temperature mentioned in the first paragraph. The maximum temperature in the course of anionic polymerization did not exceed 190° C.

Experiment No. 3

In the same manner as in Exp. No. 2, 0.5 ml. of n-butyl lithium was added to a small part of mixture in the polymerization vessel which was immersed in a water bath at 7° C. The temperature of the treated part was 100° C. The anionic polymerization of styrene of said part started and the anionic polymerization of styrene in the entire mixture progressed steadily.

The time required for the anionic polymerization was 3.5 minutes. The resulting polystyrene was not discolored and had a tensile strength of 450 kg./cm.$^2$ showing a high mechanical strength.

The polymerization heat was removed effectively in the anionic polymerization of styrene by dipping the polymerization vessel in a water bath at the temperature mentioned in the first paragraph. The maximum temperature in the course of anionic polymerization did not exceed 190° C.

Experiment No. 4

A polymerization vessel containing the monomer mixture was immersed in a water bath at 60° C. to heat the whole mixture at 60° C. The anionic polymerization of styrene in the entire mixture occurred simultaneously.

The time required for the anionic polymerization was 3 minutes. The styrene was polymerized anionically with the evolution of polymerization heat all at once in a large amount causing coloration of the polystyrene to turn brown. The product had a tensile strength of 350 kg./cm.$^2$ and was inferior in the mechanical strength when compared to the products of 1, 2 or 3.

The anionic polymerization was conducted under conditions causing the whole styrene in the polymerization vessel to be initiated at the same time. The polymerization heat accumulated and resulted in a maximum temperature during the course of anionic polymerization to reach 250° C.

EXAMPLE 2

The mixtures A and B of Table 2 were prepared as follows:

Styrene 500 g. was placed in a 1 liter glass vessel, which was sealed after purging completely with nitrogen gas. The temperature of styrene was maintained at 0° C. by a constant temperature water bath. Two ml. of n-butyl lithium (corresponding to 0.65 mol per 1,000 mols of styrene) as a 12% solution in liquid paraffin were added as the anionic polymerization catalyst. The contents were stirred thoroughly and identified as Mixture A.

Following the procedure used for Mixture A, methyl methacrylate, a non-aromatic vinyl compound, was used instead of said styrene and all other conditions and components were the same as in said Mixture A. This was identified as Mixture B.

Each of Mixtures A and B obtained as described above was maintained at 10° C. and placed in a polymerization vessel having a diameter of 0.8 cm.; a height of 60 cm., and after purging with nitrogen, was sealed under a pressure of 10 kg./cm.$^2$ (gauge). Each polymerization vessel was then immersed in a water bath at 10° C. and the anionic polymerization was conducted according to the description in paragraph 1 of the respective experiments in Table 2.

The time from the start of anionic polymerization to the completion thereof is shown in Table 2 with properties of said polymer as well as the efficiency in the removal of heat polymerization.

The experiment with Mixture A was conducted according to the present invention, while the experiment with Mixture B was not according to the present invention.

TABLE 2

Mixture A experiment

One half ml. of tetrahydrofuran was added to a small local portion of the monomer mixture in the polymerization vessel which was immersed in a water bath at 10° C. The temperature of the small portion rapidly increased to 100° C. beginning anionic polymerization of the styrene. The anionic polymerization of remaining styrene in the mixture then progressed sequentially.

The time required for the anionic polymerization was 3 minutes. The resulting polystyrene was not discolored and had a tensile strength of 440 kg./cm.$^2$ showing a high mechanical strength.

The polymerization heat was effectively removed by dipping the polymerization vessel in a water bath at 10° C. As a result, the maximum temperature during the course of anionic polymerization did not exceed 200° C.

Mixture B experiment

Following the procedure of the experiment with Mixture A, 0.5 ml. of tetrahydrofuran was added to a small local portion of the mixture in the polymerization vessel which was immersed in a water bath at 10° C. It was still necessary to heat the portion to 100° C. by means of a heater inserted through the side of the polymerization vessel.

After 180 minutes, very little polymethyl methacrylate was obtained.

The vessel was dipped in a water bath at 10° C. It was not necessary to remove polymerization heat because no appreciable anionic polymerization occurred.

EXAMPLE 3

Mixtures A, B, C and D were prepared using the vinyl aromatic monomers and polymerization catalysts shown in Table 3.

To 500 g. of the vinyl aromatic compound monomers in a 1 liter glass vessel, which had been completely purged with nitrogen the polymerization catalyst shown in Table 3 was added. The temperature of the monomer was kept at 0° C. by a water bath and the mixture was stirred during the addition and then thoroughly.

TABLE 3

| Mixture | Vinyl aromatic monomer Compound | Amt. (g.) | Polymerization catalyst Compound | Amount added |
|---|---|---|---|---|
| A | Styrene | 500 | Di-t-butyl peroxide. | 0.43 g. corresponding to 0.65 mol per 1,000 mols of styrene. |
| B | do | 500 | n-Butyl lithium. | 2.0 ml. (in solution)[1] corresponding to 0.65 mol per 1,000 mols of styrene. |
| C | Paramethyl styrene. | 500 | do | 1.8 ml. (in solution)[1] corresponding to 0.65 mol per 1,000 mols of styrene. |
| D | Styrene<br>Divinyl benzene. | 450<br>50 | do | 2.1 ml. (in solution)[1] corresponding to 0.65 mol per 1,000 mols of styrene and divinylbenzene. |

[1] In the above table, the amount of catalyst was added as follows: the ditertiary butyl peroxide was a commercial product and was used as supplied while the n-butyl lithium was used as 12% solution in liquid paraffin.

Each of Mixtures A, B, C and D of Table 3 was placed in a polymerization vessel having a diameter of 0.8 cm. and a height of 60 cm., which was purged and sealed with nitrogen under a pressure of 10 kg./cm.$^2$ (gauge) and maintained at 10° C. by immersion in a water bath. Each monomer was then polymerized by the procedure shown in paragraph 1 of Table 4.

The time from the start of polymerization to completion of anionic polymerization and the properties of each polymer are described in Table 4 as well as the efficiency of the removal of heat of polymerization.

TABLE 4

Experiment with Mixture A

The polymerization vessel was immersed in a water bath at 10° C. A small local portion of the monomer was heated to 100° C. by a heater inserted through the side of the polymerization vessel.

The polymerization of the small portion of monomer did not begin.

After 500 minutes, no polystyrene was obtained.

It was not necessary to remove the polymerization heat because of no appreciable polymerization occurred.

Experiment with Mixture B

The procedure of the experiment with Mixture A was followed and anionic polymerization began.

The time required for the anionic polymerization was 4 minutes. The resulting polyparamethylstyrene was not and had a tensile strength of 450 kg./cm.$^2$ showing a high mechanical strength.

The polymerization heat was removed effectively by immersion in a water bath at 10° C. As a result, the maximum temperature in the course of anionic polymerization did not exceed 190° C.

Experiment with Mixture C

The procedure of the experiment with Mixture A was followed and anionic polymerization began.

The time required for the anionic polymerization was 4 minutes. The resulting polyparamethylstyrene was not discolored and had a tensile strength of 440 kg./cm.$^2$ showing a high mechanical strength.

The polymerization heat was removed effectively as in the experiment with Mixture B. As a result, the maximum temperature in the course of anionic polymerization did not exceed 180° C.

Experiment with Mixture D

The procedure of the experiment with Mixture A was followed and anionic polymerization began.

The time required for the anionic polymerization was 6 minutes. The resulting polymer of styrene and divinylbenzene was not discolored and had a tensile strength of 450 kg./cm.$^2$ showing a high mechanical strength.

The polymerization heat was removed effectively as in the experiment with Mixture B. As a result, the maximum temperature did not exceed 170° C.

What is claimed is:

1. In a process for anionic mass polymerization of an aromatic vinyl monomer mixture containing an anionic polymerization catalyst, the improvement comprising using an organo alkali metal compound as said catalyst in an amount of 0.02 to 3.5 mols catalyst per 1000 mols monomer, maintaining said monomer mixture at a temperature below 40° C. and below the heat of polymerization of said vinyl monomer mixture, heating a small local area of said mixture to a temperature over 40° C. to initiate anionic polymerization in said local area whereby the anionic polymerization generates heat of polymerization, progressively polymerizing surrounding monomer areas using the heat of polymerization generated in the preceding anionic polymerization area to initiate the succeeding polymerization area and continuing said progressive polymerization until the entire monomer mixture is anionically polymerized, whereby the debilitating accumulation of heat from a simultaneous polymerization is substantially avoided while rapid polymerization of the entire monomer mixture is accomplished.

2. The improvement of claim 1 wherein the organo alkali metal compound contains a metal selected from the group consisting of lithium, sodium, potassium, rubidium and cesium.

3. The improvement of claim 1 wherein said organo alkali metal compound is selected from the group consisting of alkyl-, aryl-, alkaryl- and arylalkyl lithium compounds.

4. The improvement of claim 3 wherein said organo alkali metal compound is selected from the group consisting of n-butyl lithium, sec.-butyl lithium, n-amyl lithium, benzyl lithium and hexylene dilithium.

5. The improvement of claim 3 wherein the aromatic vinyl monomer is selected from the group consisting of styrene, o-methyl styrene, p-methyl styrene, 2,5-dimethyl styrene and divinyl benzene.

6. The improvement of claim 5 wherein the aromatic vinyl monomer is styrene and the organo alkali metal compound is n-butyl lithium.

7. The improvement of claim 6 wherein the n-butyl lithium is present in an amount of about 0.5 to about 1 mole per 100 mols of styrene.

8. The improvement of claim 1 wherein the monomer mixture is maintained at a temperature of at most 10° C. before heating said small local area and wherein the temperature to which said small local area is heated is about 80° C. to about 110° C.

9. The improvement of claim 1 wherein the monomer mixture contains more than one aromatic vinyl monomer.

10. The improvement of claim 1 wherein more than one small local area is heated.

11. The improvement of claim 1 wherein the anionic polymerization catalyst is a mixture of at least 2 organo alkali metal compounds.

12. The improvement of claim 1 wherein said heating of the small local area is accomplished by inserting a body having a temperature of about 80° C. to about 110° C. into said monomer mixture.

13. The improvement of claim 1 wherein said heating of the small local area is accomplished by introducing a small amount of a chemical initiator selected from the group consisting of a Lewis base, an ether and an amine into said monomer mixture.

14. The improvement of claim 1 wherein the monomer mixture contains at least one non-reactive additive.

15. The improvement of claim 1 wherein said rapid polymerization is conducted under an inert gas atmosphere.

16. A process for rapidly mass polymerizing an aromatic vinyl monomer having a vinyl group attached to a ring carbon atom, which comprises mixing an organo alkali metal anionic polymerization catalyst with said aromatic vinyl monomer in an amount of 0.02 to 3.5 mols catalyst per 1000 mols monomer, maintaining the mixture of monomer and catalyst below about 10° C., heating at least one small local area of said monomer mixture to a temperature of at least 60° C. to initiate anionic polymerization in said small local area, said anionic polymerization generating heat of polymerization, initiating polymerization of the surrounding monomer area by said generated heat of polymerization and continuing progressive polymerization of surrounding monomer areas until the entire monomer mixture is anionically polymerized.

References Cited

UNITED STATES PATENTS

| | | | |
|---|---|---|---|
| 2,989,517 | 6/1961 | Hanson | 260—93.5 |
| 3,325,453 | 6/1967 | Lim | 260—63 |
| 3,349,070 | 10/1967 | Thayer | 260—93.5 |
| 3,439,065 | 4/1969 | Luftglass | 260—880 |

OTHER REFERENCES

Zilkha, Albert; Albeck, Michael; Frankel, Max: Anionic Polymerization of Vinyl Monomers, Journal of Chemical Education, vol. 35, July 35, July 1958, No. 7, pp. 345–6.

Homogeneous Synthesis of Isotactic Polystyrene using n-Butyllithium Initiator, Nature, vol. 187, No. 4735, July 30, 1960, p. 410.

Welch, F. J.: The Polymerization of Styrene by n-Butyllithium, Journal of the American Chemical Society, vol. 81, Mar. 20, 1959, pp. 1345–48.

Encyclopedia of Polymer Science and Technology, vol. 13, 1971, Styrene Polymers (Polymerization), pp. 184–187, Interscience Publishers.

JOSEPH L. SCHOFER, Primary Examiner

R. S. BENJAMIN, Assistant Examiner

U.S. Cl. X.R.

260—80.78,93.5 S